US008423635B2

(12) United States Patent
Catlin et al.

(10) Patent No.: US 8,423,635 B2
(45) Date of Patent: Apr. 16, 2013

(54) SYSTEM AND METHOD FOR AUTOMATIC CALL FLOW DETECTION

(75) Inventors: Jon Catlin, Fountain Hills, AZ (US); James Bryan Rush, Litchfield Park, AZ (US)

(73) Assignee: Enghouse Interactive Inc., Phoenix, AZ (US)

( * ) Notice: Subject to any disclaimer, the term of this patent is extended or adjusted under 35 U.S.C. 154(b) by 1709 days.

(21) Appl. No.: 11/761,162

(22) Filed: Jun. 11, 2007

(65) Prior Publication Data

US 2008/0304650 A1 Dec. 11, 2008

(51) Int. Cl.
*G06F 15/173* (2006.01)
*H04M 1/64* (2006.01)

(52) U.S. Cl.
USPC .................................. 709/224; 379/88.04

(58) Field of Classification Search .................. 709/224; 379/88.04
See application file for complete search history.

(56) References Cited

U.S. PATENT DOCUMENTS

| | | | |
|---|---|---|---|
| 5,940,604 A | 8/1999 | Merryman et al. | |
| 6,697,964 B1 | 2/2004 | Dodrill et al. | |
| 6,999,930 B1 | 2/2006 | Roberts et al. | |
| 7,016,845 B2 | 3/2006 | Vora et al. | |
| 7,133,830 B1 | 11/2006 | Hoban et al. | |
| 7,142,661 B2 | 11/2006 | Erhart et al. | |
| 7,184,523 B2 | 2/2007 | Dixit et al. | |
| 7,231,636 B1 | 6/2007 | Evans | |
| 8,014,726 B1 | 9/2011 | Petersen et al. | |
| 8,301,757 B2 * | 10/2012 | Catlin et al. | 709/224 |
| 2002/0198719 A1 | 12/2002 | Gergic et al. | |
| 2003/0055983 A1 | 3/2003 | Callegari | |
| 2003/0083882 A1 | 5/2003 | Schemers, III et al. | |
| 2003/0212558 A1 | 11/2003 | Matula | |
| 2003/0212561 A1 | 11/2003 | Williams et al. | |
| 2004/0220810 A1 | 11/2004 | Leask et al. | |
| 2004/0225499 A1 | 11/2004 | Wang et al. | |
| 2004/0247094 A1 | 12/2004 | Crockett et al. | |

(Continued)

FOREIGN PATENT DOCUMENTS

| | | |
|---|---|---|
| KR | 2004023990 | 3/2004 |
| WO | 03/096663 A2 | 11/2003 |

OTHER PUBLICATIONS

International Preliminary Report on Patentability mailed Dec. 23, 2009.

(Continued)

*Primary Examiner* — Joseph Avellino
*Assistant Examiner* — Jeong S Park
(74) *Attorney, Agent, or Firm* — Adam R. Stephenson, Ltd.

(57) ABSTRACT

A method and exploration engine for automatically detecting a call flow path of a voice application having a plurality of dialog states, the method comprising the steps of: identifying, in an automated manner, the plurality of dialog states of the voice application through execution of the voice application; and identifying at least one relationship between the plurality of dialog states. The method may further comprise some of the following steps: creating a unique identifier (ID) for one of the plurality of dialog states, wherein the unique ID is based on information received when executing the voice application, wherein the information comprises attributes associated with one of the plurality of dialog states; storing the unique ID and other information associated with the dialog state; and graphically illustrating a call flow path of the voice application based on the unique ID and other information stored in the database.

24 Claims, 6 Drawing Sheets

U.S. PATENT DOCUMENTS

| | | |
|---|---|---|
| 2005/0069102 A1 | 3/2005 | Chang |
| 2005/0135572 A1 | 6/2005 | Da Palma et al. |
| 2005/0135575 A1 | 6/2005 | Haskey et al. |
| 2005/0137875 A1 | 6/2005 | Kim et al. |
| 2005/0276391 A1 | 12/2005 | Ibbotson et al. |
| 2005/0286707 A1 | 12/2005 | Erhart et al. |
| 2006/0018443 A1* | 1/2006 | Knott et al. ................. 379/88.16 |
| 2006/0041431 A1 | 2/2006 | Maes |
| 2006/0230410 A1 | 10/2006 | Kurganov et al. |
| 2006/0235694 A1 | 10/2006 | Cross et al. |
| 2007/0027962 A1 | 2/2007 | Straut et al. |
| 2007/0041528 A1 | 2/2007 | Menon et al. |
| 2007/0043568 A1 | 2/2007 | Dhanakshirur et al. |
| 2007/0112953 A1 | 5/2007 | Barnett |
| 2007/0129947 A1* | 6/2007 | Agapi et al. ................... 704/257 |
| 2007/0179778 A1* | 8/2007 | Gong et al. ....................... 704/9 |
| 2007/0258435 A1 | 11/2007 | Saito et al. |
| 2008/0112542 A1* | 5/2008 | Sharma ........................ 379/1.02 |
| 2008/0304632 A1* | 12/2008 | Catlin et al. ............... 379/88.04 |

OTHER PUBLICATIONS

"Cisco IP Integrated Contact Distribution Cisco Customer Response Solutions Version 3.0 for the Cisco ICS 7750 Integrated Communication System," (2002), Data Sheet, Cisco Systems.

Angstrom, Andreas and Sverin, Johan, "VoiceXML," (May 24, 2004), Report, Royal Institute of Technology, Stockholm, Sweden.

"Go ahead, talk. The Web is listening. How Voice eXtensible Markup Language (VXML) is revolutionizing the way humans interact with their telephones and the World Wide Web," (2003), Whitepaper, Nortel Networks.

* cited by examiner

SYSTEM AND METHOD FOR AUTOMATIC CALL FLOW DETECTION

FIELD OF INVENTION

The present invention relates generally to the testing and analysis of voice applications associated with Interactive Voice Response systems, and more particularly to an automated system and method for discovering the call flow of a voice application to capture dialog state patterns, map dialog states, and identify dialog state relationships.

BACKGROUND OF THE INVENTION

An Interactive Voice Response (IVR) system in its simplest form automates the process of directing calls to the appropriate individual. In recent years, however, IVR systems have evolved into very complex computerized voice applications that enable callers to order products, for example, over the telephone and without ever being connected to a human being. Such systems require tremendous human effort to develop and maintain due to a large number of interconnecting dialog states. A dialog state may be thought of in terms of the information between when a caller provides an input and when the system waits for the next input (e.g., pressing of a number on a telephone handset or a verbal command) from the caller in order to determine a next dialog state. For example, a caller to a pharmacy may be first instructed to "press 1 for English or press 2 for Spanish." If the caller presses "1", then the IVR system traverses to an English language dialog state where the user is prompted to "enter 1 to refill your prescription; 2 to speak with a pharmacist; or 3 to check the status of your refill order."

IVR applications are constructed in a similar manner to standard computer applications and HTML web pages. In fact, VoiceXML ("VXML") is a simple Extensional Markup Language standard created specifically for developing IVR applications. While the language standard may be simple, the IVR applications that are built off of it may be incredibly complex and thereby difficult to test. Traditionally, system testers take on the role of end users by calling the IVR system and interacting with the system as would be expected from an average end user. Therefore, it is easy to appreciate that testing very large and complex systems requires the expenditure of many man-hours and further requires attention and patience. Testing with large numbers of accounts and testing of all (or most) paths is usually impossible in the prior art. Testing, however, is vital to ensuring that all of the paths correctly link the various dialog states.

In recognition of the problems associated with creating, testing, and maintaining IVR applications, tools have been developed to assist in the testing process. Load testing tools include a call-processing unit that places a number of simultaneous and/or repeated calls to the IVR application. While these tools have the ability to detect deviations in application response (e.g., length of pause between inputs, length of audio cues, system hang-ups, etc), these tools do not provide insight into the actual behavior of the voice application. The test scripts used in such load testing, in the prior art, must be manually created and then later updated each time the application is changed.

Therefore, a need exists for a system that facilitates testing of IVR voice applications in a less time consuming manner, and facilitates reducing the time to develop a voice application. A need exists for a system that facilitates testing of a greater number of the call flow paths of a voice application. A need exists for a system that can discover the call flow paths of a voice application, and perform a complete voice application analysis through direct interaction with the voice application.

SUMMARY OF THE INVENTION

In accordance with various exemplary embodiments of the present invention, systems and methods are provided for automatically identifying call flow paths in a voice application. More particularly, the invention may comprise an exploration engine, which captures, and processes IVR voice application documents, and identifies unique dialog states based on audio files and/or grammars referenced in the documents. The unique dialog states are used to map the call flow of the voice application.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

In general, the invention includes a system and method for performing automatic call flow discovery through the mapping of call flow dialog states and their interrelationships. In accordance with various aspects of the present invention, by analyzing the grammars associated with a dialog state, all of the valid choices that can be spoken or entered by the caller can be identified. This information may be used to facilitate the exploration of the call flow of the voice application. Moreover, the grammars and/or other information associated with each state may be used to uniquely identify each dialog state and its relation to other states. Thus, in accordance with various aspects of the present invention, the system and method are configured to facilitate automatic discovery of the call flow of a voice application.

Figure 1:
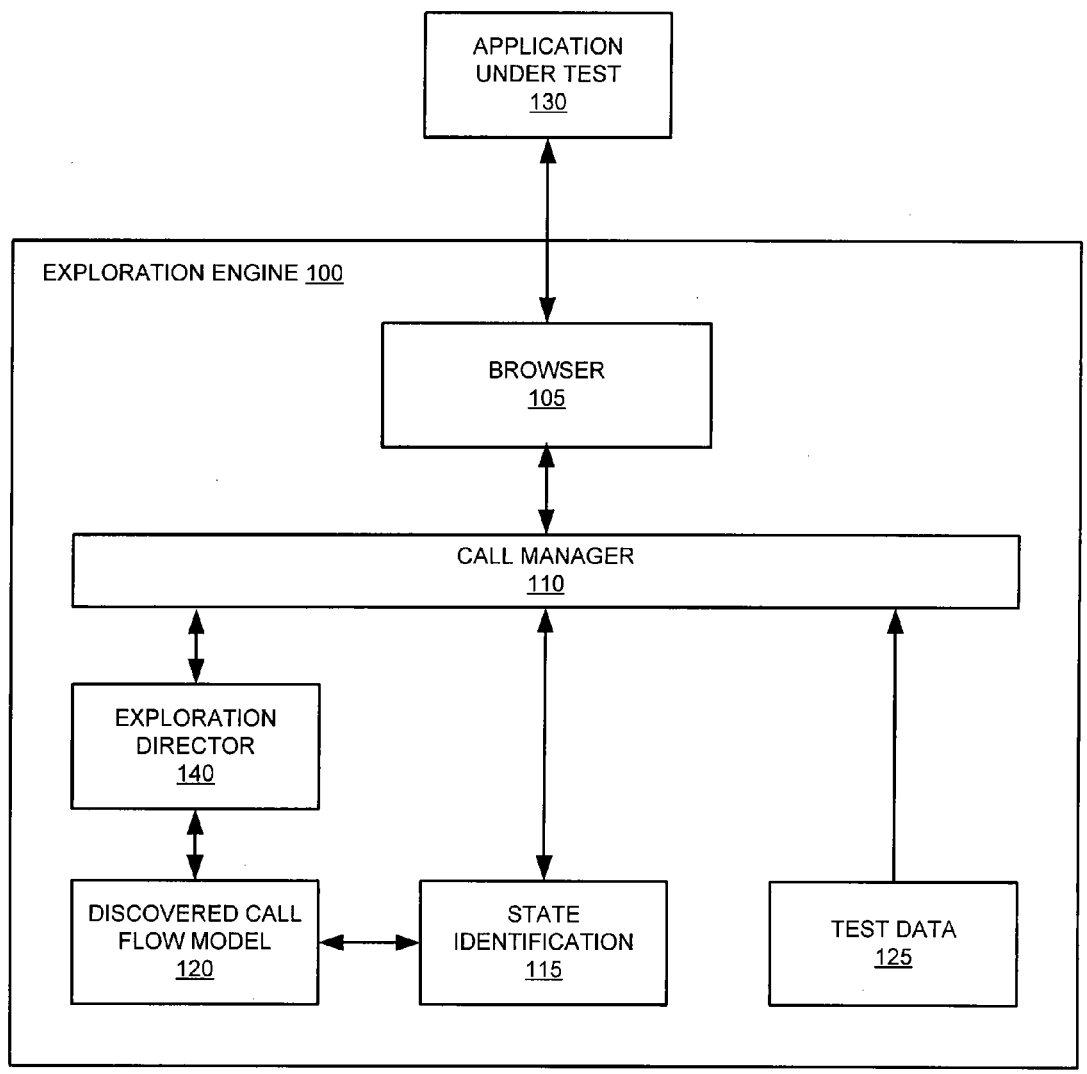
FIG. 1 is a block diagram illustrating a high level view of the major system components for an exemplary system for automated call flow exploration in accordance with an exemplary embodiment of the present invention.

With reference to FIG. 1, and in accordance with various exemplary embodiments of the present invention, the system includes a number of software, hardware, and data components that together comprise an exploration engine 100. In accordance with an exemplary embodiment, exploration engine 100 comprises a browser 105, a call manager 110, a state identification component 115, a discovered call flow model component 120, and an exploration director 140. Exploration engine 100 may further comprise a test data component 125.

In one exemplary embodiment, browser 105 is configured to communicate with an application under test 130. Call manager 110, in this exemplary embodiment, is configured to communicate with browser 105, exploration director 140, state identification component 115, and/or discovered call flow model component 120.

In accordance with an exemplary embodiment, exploration engine 100 comprises a browser configured to execute a browser based voice application. For example, exploration engine 100 may include a VXML browser 105 configured to fetch and execute a VXML document. Although described herein as a VXML browser, browser 105 may be a SALT browser 105, CCXML browser 105, or any other similar browser configured to fetch and execute a document involving a similar programming language.

Regardless of the programming language, browser 105 may be configured to receive documents from the application under test 130 and execute (or translate) the information in those documents into attributes of the dialog states associated with that application. For example, browser 105 may generate grammars, audio files, text, and other attributes. Browser 105 may be further configured to communicate these attributes to call manager 110. Browser 105 may also be configured to receive input from call manager 110 and to use that input to send a response to the voice application. This response may simulate a caller's input such as pressing a number or speaking a response to a dialog prompt of the voice application.

Call manager 110, in one exemplary embodiment, is configured to receive these attributes from browser 105 and pass them on to state identification component 115 and/or exploration director 140. Call manager 110 may be further configured to receive input from state identification component 115 and/or exploration director 140. In various exemplary embodiments, call manager 110 is configured to provide input to browser 105 simulating a caller's input. Call manager 110 may be further configured to control which call flow paths are to be further investigated. In accordance with various exemplary embodiments of the present invention, the call manager is configured to control the calls in progress and drive the exploration. The call manager is also responsible for other call control tasks such as the regression and load testing. The call manager may also be configured to work as an interface.

For each state in the application under test, state identification component 115 may be configured to uniquely identify that state based on the attributes passed to state identification component 115 from call manager 110. In an exemplary embodiment, state identification component 115 is further configured to determine if the current state is one that has been encountered before during the exploration, and if not to identify that state with a unique ID. State identification component 115 may provide this unique ID back to call manager 110. State identification component 115 may further provide this unique ID to discovered call flow model 120 to be saved with other discovered states and related information (such as information about the path taken to arrive at that state). State identification component 115, may further comprise any hardware and/or software configured to uniquely identify the states of a voice application as it is being explored.

Discovered call flow model 120, in an exemplary embodiment, is configured to store information identifying discovered states in the voice application as well as store other relevant data. For example, model 120 may store the unique ID for a particular state, the rules used to create that ID, attributes associated with that state, the path followed to arrive at that state, the ID of the immediately prior state, and/or the input that caused the voice application to navigate from the previous state to the current state. Model 120 may comprise a database, however, model 120 may comprise any hardware and/or software configured to store information useful for identifying the discovered states in the voice application and/or other relevant data. This information/data may be further used to facilitate mapping, generating visual call flow results, providing input to other call flow applications, and/or analyzing the call flow of the tested voice application.

In accordance with an exemplary embodiment, exploration director 140 is configured to observe the call flow as the exploration takes place, to determine which paths to take, and to identify paths not taken and cue those paths (e.g., in a work cue) for later exploration. Thus, exploration director may be any component configured to direct the call manager in how it explores the various paths of the voice application.

Exploration engine 100 may optionally use test data 125 while identifying any one or more dialog states in the voice application under test 130. Test data 125 may comprise specific information used as inputs at a particular dialog state(s). Such information may include, for example, passwords, account numbers, names, and/or any specific information that an analyst desires to use in the analysis of the voice application. These various components and their interactions in order to execute the steps and processes of the invention will be described herein in greater detail.

As used herein, VoiceXML (VXML) is the W3C's standard XML format for specifying interactive voice dialogues between a human and a computer. VXML enables the development and deployment of voice applications in an analogous manner to HTML for visual applications. Just as HTML documents are interpreted by a visual web browser, VXML documents are interpreted by a VXML browser. A common architecture is to deploy voice browsers attached to the public switched telephone network (PSTN) so that users can use a telephone to interact with voice applications. A VXML document may comprise tags that define when to play audio, what grammars are active, how to process errors, and other call flow attributes. A VXML document may also contain ECMAScript (also known as JavaScript) that is executed when the document is processed. While processing a VXML document, the following actions may occur: playing of audio files or rendered text-to-speech, setting of VXML defined properties, performing a recognition using one or more Speech Recognition Grammar Specification ("SRGS") grammars that define allowable input, processing a telephony function such as a hang up or transfer, fetching and processing a new document, and executing metadata. The process of identifying the application call flow may be based upon some or all of the attributes of the VXML document as well as any of the resulting actions that occur when executing the VXML document.

While VXML is referenced extensively herein, practitioners will appreciate that the functions of the invention may be equally effective within other exiting and/or future platforms. For example, the invention may be implemented within a Speech Application Language Tags (SALT) platform or a CCXML platform. SALT includes a specification, which enables multimodal and telephony-enabled access to information, applications, and web services from PCs, telephones, tablet PCs, wireless personal digital assistants (PDAs), and the like. Other deterministic languages may also be suitable for the invention described herein. This would be the case of any logical document that provides a suitable amount of identifiable dialog state characteristics and grammars that provide a list of valid inputs.

Figure 2:
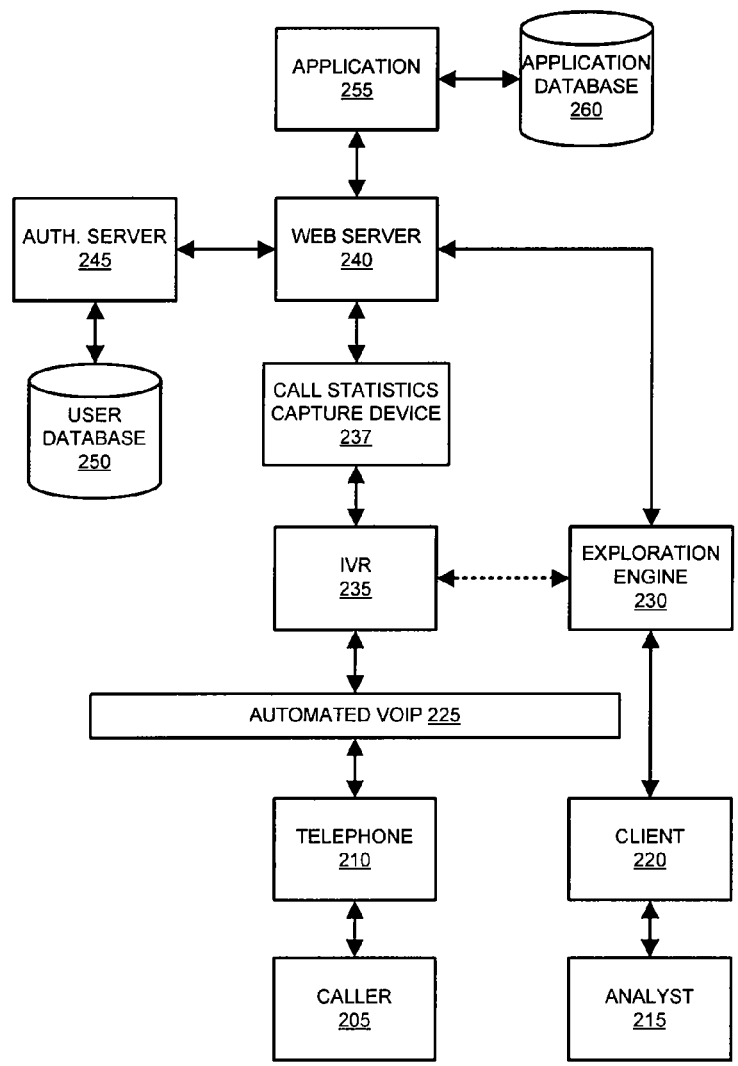
FIG. 2 is another block diagram illustrating the major system components for an exemplary system for automated call flow exploration in accordance with an exemplary embodiment.

FIG. 2 is a high-level system diagram providing a holistic view of various system components and their interactions. Practitioners will appreciate that the system may employ any number and configuration of hardware, software, and data components for the purpose of practicing the disclosed invention. FIGS. 1 and 2 are presented for the purpose of explanation and are not intended to limit the scope of the invention in any way. For example, the system illustrated in FIG. 2 may further incorporate various report engines, routers, hubs, firewalls, databases, middleware applications, application servers, host mainframes, personal computers, handheld devices, communication devices, and the like.

Various technologies have been used to implement IVR systems. One such technology is Voice over IP (VoIP), which enables traditional telephone communications to take place over the Internet. An automated VoIP 225 converts analog audio signals to digital data that can be transmitted over the Internet. Automated VoIP 225 further converts digital signals from the Internet to analog signals that can then be transmitted over a traditional telephone network. Thus, a caller 205 executing a call through the use of a telephone 210 may interact with IVR 235 when the analog signals are converted to digital signals through the automated VoIP 225.

In response to signals received through automated VoIP 225, IVR 235 transmits a request for a markup language document from web server 240. The document contains various references to sound files and other elements needed to instruct IVR 235 regarding dialog state transitions in response to grammars. As used herein, grammars include application 255 input expectations. For example, grammars may include tones that are generated in response to pressing telephone handset buttons. More complex grammars include verbal commands. In such systems IVR 235 includes natural language speech recognition software to convert spoken commands to digital commands that can be processed by voice application 255.

Upon receiving a request from IVR 235, web server 240 invokes voice application 255 to retrieve call flow data from call flow database 260. In one embodiment, voice application 255 retrieves an entire call flow at the start of voice application 255 execution. In another embodiment, voice application 255 retrieves portions of the call flow as needed throughout the duration of a call. As used herein, a call flow includes a set of instructions relating to any number of dialog states. Each dialog state may include any number of links to other dialog states as defined by these instructions. For example, a first dialog state in a call flow may include a first link to an organization's customer service department dialog state, a second link to the accounting department dialog state, a third link to a sales department dialog state, and a fourth link to call termination dialog state. In accordance with an exemplary embodiment, each dialog state has associated therewith, at least one grammar.

In accordance with an exemplary embodiment, a dialog state may end after processing an input and a dialog state may begin either at the beginning of a call or after the end of the previous input. The dialog state may be associated with all the audio or processed Text-To-Speech from the point the state starts until it ends.

To control access to web server 240 or any other component of the invention, web server 240 may invoke an authentication server 245 (in conjunction with a user database 250) in response to receipt of caller 205 authentication credentials at web server 240 by way of IVR 235. In one embodiment, authentication server 245 includes any hardware and/or software suitably configured to receive authentication credentials, encrypt and decrypt credentials, authenticate credentials, and grant access rights according to caller 205 predefined privileges attached to the credentials. Authentication server 245 may grant varying degrees of application and data level access to caller 205 based on caller information stored within user database 250. In one embodiment, authentication server 245 processes caller 205 credentials during an authentication dialog state.

In accordance with an exemplary embodiment of the present invention, exploration engine 230 may be invoked by a client computer 220 operated by an analyst 215. As used herein, an analyst may include a person and/or any hardware and/or software suitably configured to facilitate testing and performing analysis of call flows. In one embodiment, the analyst is a call flow tester who interacts with exploration engine 230 by way of a client computer 220 to practice the disclosed dialog state mapping processes. Client 220 may comprise a personal computer with a Local Area Network (LAN) connection to exploration engine 230, a computing device connected via the Internet, or any other connecting means disclosed herein and/or known in the art.

Exploration engine 230 may include a web server configured to facilitate communication between client 220 and either web server 240, or voice application 255. In one embodiment, exploration engine 230 may emulate the functionality of IVR 235, thereby enabling the IVR 235 to be bypassed and to provide the expected response directly to web server 240. In yet another embodiment, exploration engine 230 may establish a direct connection with voice application 255 by emulating the functionality of web server 240.

Figure 3:
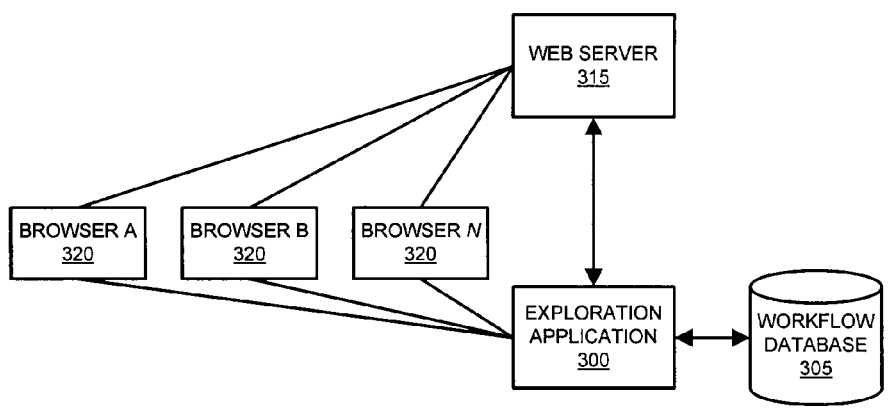
FIG. 3 is a block diagram illustrating the major system components for an exemplary exploration engine for performing automated call flow testing and analysis in accordance with an exemplary embodiment.

With reference to FIG. 3, exemplary core components of exploration engine 230 are illustrated. Practitioners will appreciate that the exploration engine may comprise software and/or hardware systems that are proprietary, commercially available, or any combination thereof. Exploration engine includes an exploration application 300 that maintains the computing logic required to interact with the other exploration engine components as well as any of the other components described herein. Specifically, exploration application 300 processes instructions from client 220 and executes call flow testing, analysis, and presentation of call flow data relating to the architecture of a call flow, call flow errors, dialog state mappings, and the like.

Exploration engine 230 may include an exploration web server 315 configured to serve as an interface between browser applications 320 and web server 240. Exploration application 300 may invoke any number of browser applications 320 to concurrently explore various parts of one or more call flows. In this manner, exploration engine 230 may test and/or analyze a call flow in an efficient manner. In an exemplary embodiment, exploration application 300 issues commands to each active browser application 320, which transmit inputs to web server 240 based on grammars in each call flow dialog state.

In an exemplary embodiment, as one or more browser applications 320 encounter an unknown dialog state, exploration engine 230 is configured to create a unique identifier based on that dialog state's attributes and stored this unique ID in the workflow database 305. The unique identifier may be a hash value based on that dialog state's attributes and/or other information associated with that state. In creating the hash value, exploration engine may analyze the dialog state to determine a combination of tags, referenced to audio files, text, and/or the like. These and other unique attributes of the dialog state may be combined to create a unique hash that serves as a "fingerprint" for the dialog state. If exploration application 300 subsequently encounters a dialog state with a hash value (fingerprint) matching any hash values in workflow database 305, it will be able to quickly determine that voice application 255 has returned one of browser applications 320 to a previously visited dialog state.

Figure 4:
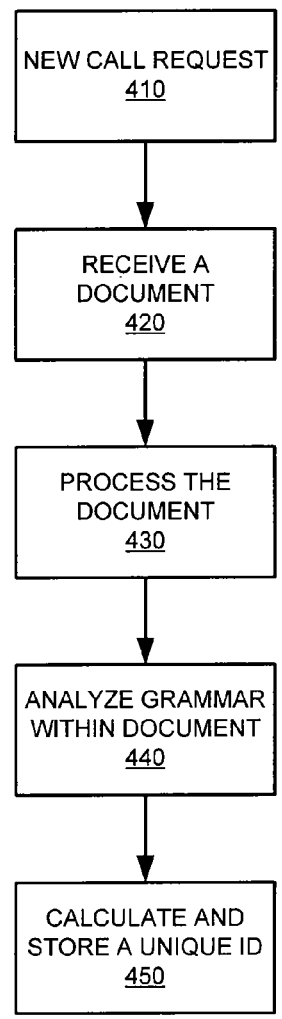
FIG. 4 is a flow chart of major steps in a method for automatically detecting the flow path in a voice application.

Referring now to FIG. 4, the process flows depicted are merely embodiments of the invention and are not intended to limit the scope of the invention as described above. For example, the steps recited in any of the method or process descriptions may be executed in any order and are not limited to the order presented. It will be appreciated that the following description makes appropriate references not only to the steps depicted in FIG. 4, but also to the various system components as described above with reference to FIGS. 1-3. In one embodiment, the system includes a client interface 220 configured to enable analyst 215 to interact with the exploration engine 230. Such an interface may include web pages, websites, web forms, prompts, etc. Practitioners will appreciate that the illustrated steps described below may be facilitated through any number of configurations including the use of web pages, web forms, popup windows, prompts and the like. It should be further appreciated that the multiple steps as illustrated and described may be combined onto single web pages but have been expanded for the sake of simplicity. In other cases, steps illustrated and described as single process steps may be broken down into multiple web pages but have been combined for simplicity.

Practitioners will also appreciate that there are a number of methods for displaying/presenting data within a browser based document at client 220. Data from exploration engine 230 may be represented as standard text or within a fixed list, scrollable list, drop-down list, editable text field, fixed text field, pop-up window, graphical representations, and the like. Likewise, there are a number of methods available for modifying data in a webpage such as, for example, free text entry using a keyboard, selection of menu items, check boxes, option boxes, and the like. Data from application 255 may be represented within a markup language document configured for voice applications such as, for example, VoiceXML and SALT.

In the descriptions for FIG. 4, common reference is made to the process steps of transacting data transmissions between client 220 and voice application 255. However, a practitioner will appreciate that the steps as described below may be accomplished through any number of process steps and methods producing similar results. As used herein, "transmit" may include sending electronic data from one system component to another over a network connection. Additionally, as used herein, "data" may include encompassing information such as commands, queries, files, data for storage, and the like in digital or any other form.

In accordance with an exemplary embodiment of the present invention, an exploration engine 230 is configured to analyze a voice application 255. The voice application may for example be a VoiceXML application. In another exemplary embodiment, the voice application is a SALT voice application. In another exemplary embodiment, the voice application is a CCXML voice application. Furthermore, the voice application may be any browser based application configured to provide voice and/or tone directed navigation.

The voice application may be understood or represented by a state diagram. It will be appreciated that state diagrams are merely a tool for better understanding a process flow, and that other graphical, relational, and similar systems may be used to facilitate analyzing the process flow of a voice application. In accordance with an exemplary embodiment, the system is described in terms of a dialog state diagram and with a particular definition of an individual dialog state. But, it will be recognized that a dialog state may be defined in various ways that are still encompassed within the scope of the present invention. In an exemplary embodiment of the present invention, a method is provided for discovering/detecting/identifying the dialog state diagram of a voice application and to do so in an automated way.

As used herein, a dialog state represents the moment starting after the last input was received in a previous dialog state up until an input is entered in the current dialog state. A particular dialog state may therefore encompass all the audio played before an input is solicited. In an exemplary embodiment, the step of receiving the input is part of the dialog state, and in other embodiments, the input received is not considered part of the dialog state, but rather as information received between dialog states that cause the voice application to move to the next dialog state.

In one embodiment, a first dialog state begins by the playing of an audio file stating, "Welcome to the Main Menu. Please press 1 to make a purchase, press 2 to open a new account, press 3 to pay your bill, and press 4 for help." The dialog state further includes the instructions that invoked the playing of this audio clip and the instructions that tell the browser how to wait for input. Once an input is received, the call flow moves to another dialog state depending on which input was provided.

In accordance with various exemplary embodiments of the present invention, a method 400 for discovering a call flow of a voice application may comprise the steps of: making a new call request, receiving a document, processing the document, analyzing the grammars in the document, and calculating and storing a hash based on the analyzed grammars.

In accordance with various exemplary embodiments, exploration engine 230 may send a "new call request" from a server on which exploration engine 230 is running to web server 240 that is running the voice application (Step 410). This may be initiated, for example, by analyst 215 or in an automated way. For purposes of illustration of this exemplary embodiment, exploration engine 230 will be described as being hosted on a stand alone application server. In accordance with other exemplary embodiments, however, exploration engine 230 may reside on a web server 240, client 220, and/or any other computing device with a network connection to the server hosting voice application 255.

The new call request may comprise any signal(s) configured to indicate to the voice application that a new call is starting. The new call request may be configured to be similar to a new call request signal from IVR 235 to web server 240. Furthermore, any other signal may be used that is configured to initiate running the voice application.

In contrast to a 'static' analysis of the voice application, which might be performed by analyzing the application code, in accordance with various exemplary embodiments of the present invention, exploration engine 230 is configured to perform a dynamic application document analysis by running (compiling/executing) the voice application being analyzed. The logical flow of a voice application may be statically discovered by analyzing the application document (e.g. a VoiceXML document) but not executing it. For example, static analysis may involve scanning a document and using tag names and their values to attempt to piece together the call flow of an application. For example, a VoiceXML document can be decomposed into different dialog states by finding FORM tags that contain grammar references. These techniques can go so far as using other tags, such as PROMPT and PROPERTY, to further disambiguate similar starts.

The static analysis approach, however, has some significant drawbacks for all but the simplest applications. First, static analysis needs the applications to have been written in a static format. Many IVR applications, however, are written in a dynamic format. Various application server technologies are used to generate application content on demand. Application documents may be retrieved by various application specific parameters derived when the original document is executed. Second, most application document standards, like VXML and SALT allow for ECMAScript to be embedded within the document. Without executing the ECMAScript in the context of the document, it can be very difficult to determine how the code will react.

In contrast, in accordance with an exemplary aspect of the present invention, dynamic analysis facilitates achieving a more thorough analysis of a voice application. Dynamic analysis is the analysis of the properties of a running program. In dynamic analysis, therefore, the application documents may be executed within a real or simulated environment. Since the documents are being fully processed, the entire application can be fetched from the application server and analyzed. This technique will work with all types of documents, whether they are statically generated or dynamically generated. In an exemplary embodiment, logic components like ECMAScript are executed as part of the document and automatically become part of the dynamic analysis. It is noted that the dynamic exploration tools and methods described herein may be useful for determining the call flow of both dynamic pages hosted by a web server as well as static pages. Moreover, the exploration engine may be configured to both fetch documents from a server as well as simply reading files/static pages.

Web server 240 may respond to the new call request by sending a document to exploration engine 230. Thus, exploration engine 230 may be configured to receive this document (Step 420). The document may be a VoiceXML document, a SALT document, a CCXML document and/or the like. In an exemplary embodiment, the document is a markup language document. The document, for example, may comprise tags, commands/instructions, references to grammars, and/or the like. The tags may be configured to reference audio clips, grammars, instructions, spoken text, and/or the like. Furthermore, the documents may contain European Computer Manufacturers Association Script, "ECMA Script," that is executed when the documents is processed. The tags may be configured to reference instructions regarding how inputs from a caller 205 should be received and processed.

In accordance with one exemplary embodiment, a single document corresponds to a single "state" in a dialog state diagram. In other exemplary embodiments, a single document may correspond to more than one dialog state. Furthermore, in some exemplary embodiments, multiple documents may comprise a single dialog state.

In accordance with another exemplary embodiment, exploration engine 230 is configured to process the document (Step 430). Processing the document may include the steps of: (a) parsing the document, (b) obtaining relevant dependent resources such as: audio files, grammars, and java script, and/or (c) executing the document. Thus, exploration engine 230 may be configured to parse the document and request all, or a portion, of the referenced audio files and/or grammars. In an exemplary embodiment, the audio files are .wav files. Nevertheless, the audio files may comprise any file type configured to provide verbal information, prompts, instructions, output, audio, and the like.

As mentioned above, exploration engine 230 is further configured to execute the document. Stated another way, exploration engine 230 is configured to cause the instructions in the document, or a subset thereof, to be executed. In one exemplary embodiment, the execution (at exploration engine 230) of an instruction to play a particular audio file causes exploration engine 230 to request the resource (audio file) from web server 240. This request may be configured to cause web server 240 to send to exploration engine 230 a signal and/or information that, if it were received by the IVR, would cause an IVR to play that audio file to a caller. The signal/information, however is received by exploration engine 230 which may be configured to capture the signal/information from the web server 240 and store that information. More generally, execution of instructions in a document may cause resources to be requested of web server 240 and to be transmitted to exploration engine 230. Thus, exploration engine may be configured in some of its functionality to mimic an IVR, but instead of playing the resources out-loud, it stores or processes those resources. In various exemplary embodiments, that information may be captured for later use in connection with identifying the relevant dialog state.

It will be appreciated that because the information is transmitted as a browser based markup language document, from one web server to another, any transmitted audio files do not have to be played. This is in contrast to the communications between an IVR and web server 240 where the IVR is typically configured to play the audio clip. Furthermore, the IVR is often configured, by the instructions it receives, to pause for a predetermined period of time before accepting reply input. Exploration engine 230, however, can receive these prompts and/or instructions and any other information that was provided to the IVR, but does not have to actually play them. Thus, exploration engine 230 can be configured to move through the voice application significantly faster than a device configured to work through the IVR to access the voice application.

In various exemplary embodiments, exploration engine 100 is configured to analyze the grammars to determine all available user input possibilities related to that dialog state. Thus, by way of an example, if a grammar is expecting one of three possible responses, then exploration engine 100 may be configured to identify those three inputs that are acceptable responses.

Figure 5:
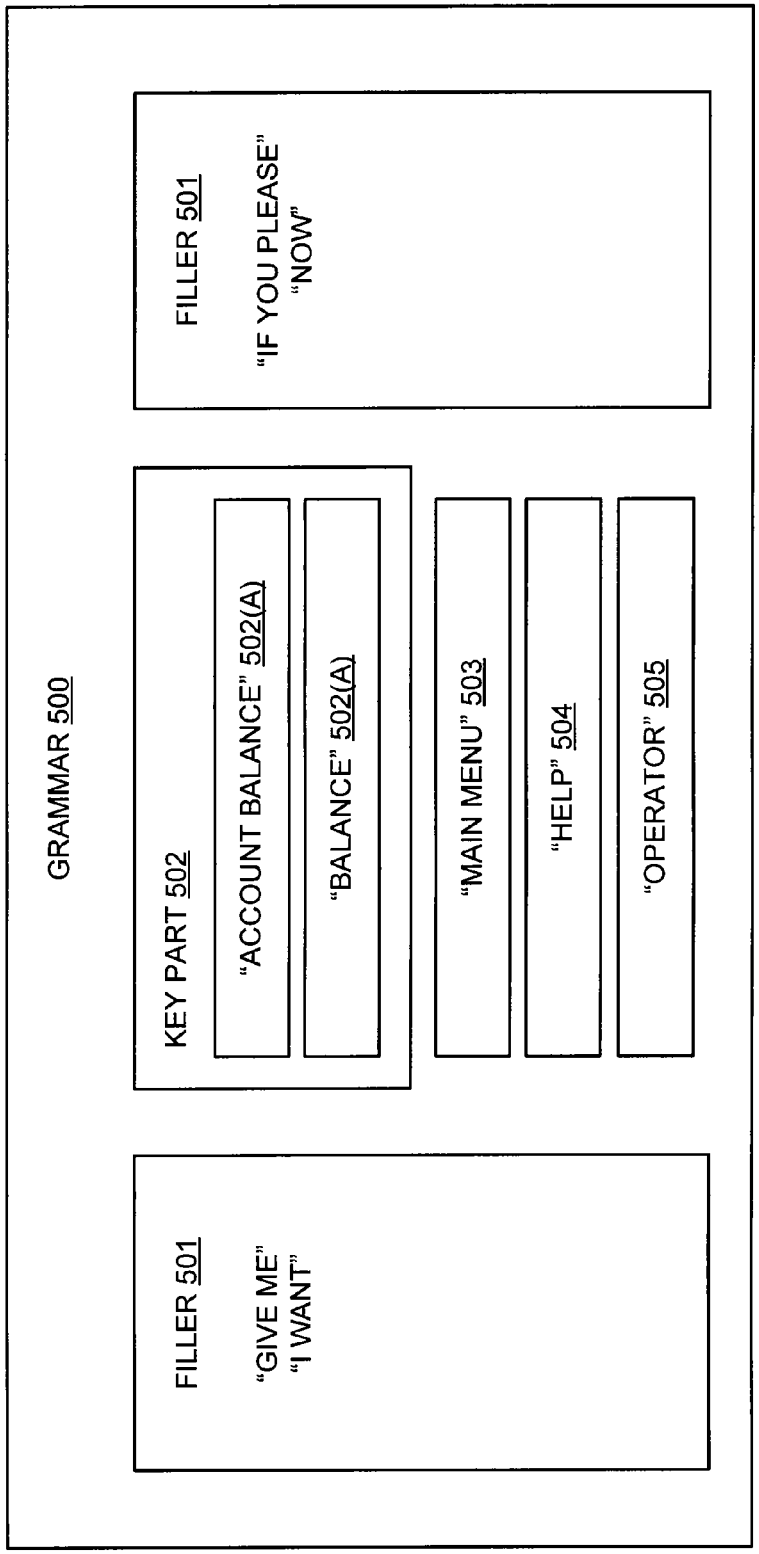
FIG. 5 illustrates an exemplary grammar and the parts thereof in accordance with an exemplary embodiment of the present invention.

In one exemplary embodiment of the present invention, a grammar defines all the possible choices that are allowed for a dialog state. With reference now to FIG. 5, a grammar 500 may define all the possible combinations of inputs. Grammar 500 may include sub parts comprising "filler" parts 501 that are inconsequential phrases, and key parts 502 that include key words or key phrases. Filler parts 501 may come before, during or after key parts 502. Grammar 500 may further identify equivalent phrases 502a, which are treated as one input option. For example, grammar 500 may recognize the phrase "Give me my balance, if you please" or the phrase "Give me my account balance, now." Because the key parts 502 are identified as equivalent key parts, both of these phrases are treated in combination as one possible input. Thus, in this example, any equivalent phrases are treated as a single input. The grammar may further define additional key parts such as, for example, "main menu" 503, "help" 504, and "operator" 505. In other exemplary embodiments, an error input is also a possible input. For example, "No Input and "Failed Recognition" may be additional possible 'inputs' and paths to be investigated along with the other valid choices recognized by the grammar(s).

The grammar may define specific numbers to be provided as input, i.e., "press 1, 2, or 3." The grammar may define an input that accommodates an account number (i.e., any 7 digit number). The grammar may also be configured to be the result of speech recognition. For example, if a speech recognition tool provides a code representing "yes", then that code will be one of the possible inputs in a grammar expecting a "yes" as one of the possible inputs. The grammar may thus be any representation of all the possible inputs that are expected in connection with a particular dialog state. Thus, exploration engine 100 is configured to analyze the grammars and identify each unique possible input that might be received. The unique input may be defined as a unique value returned from executing an expression in the grammar's Semantic Interpretation Tags. The process of producing a semantic result representing the meaning of a natural language utterance is called Semantic Interpretation (SI). The Semantic Interpretation process described in this specification may use Semantic Interpretation Tags (SI Tags) to provide a way to attach instructions for the computation of such semantic results to a speech recognition grammar. Further information on the Semantic Interpretation used in grammars associated with VXML can be found at http://www.w3.org/TR/semantic-interpretation/.

In another exemplary method of analyzing the grammars, the grammars are either inline to the VXML document or fetched from a server. In either case, the grammar is extracted or loaded. Exploration engine 100 may be configured to create a hash of the grammar contents so that it can later detect if the grammar has changed. This hash may be configured to facilitate detecting when a grammar has changed. Next the grammar may be explored to find all paths with unique semantic interpretation (SI) expressions. The method may further include the step of ignoring paths with out SI, i.e., ignoring filler. In another embodiment, if there are multiple paths with the same SI expression, the method may include the step of saving the shortest phrase that generates the SI expression (e.g. given the same SI expression, "balance" would be saved over "account balance"). Next, the SI expressions may be executed yielding programmatic results. Finally, the duplicate results are removed leaving a unique set of choices.

For sake of illustration, an exemplary simplified grammar (implemented under the SRGS and SISR standards) is illustrated.

```
1   <?xml version="1.0" encoding="UTF-8"?>
2   <!DOCTYPE grammar PUBLIC "-//W3C//DTD GRAMMAR
    1.0//EN"
        "http://www.w3.org/TR/speech-grammar/
        grammar.dtd">
3   <grammar xmlns="http://www.w3.org/2001/06/grammar"
```

-continued

```
    xml:lang="en"
            xmlns:xsi="http://www.w3.org/2001/XMLSchema-
instance" version="1.0" mode="voice"
            tag-format="semantics/1.0" root="main">
4   <rule id="main">
5       <item>
6           <item repeat="0-1">
7               <one-of>
8                   <item>give me</item>
9                   <item>i want</item>
10              </one-of>
11          </item>
12
13          <one-of>
14              <item>account balance<tag>out='balance';
                </tag></item>
15              <item>account<tag>out='balance';</tag>
                </item>
16              <item>main menu<tag>out='mainmenu';</tag>
                </item>
17              <item>help<tag>out='help';</tag></item>
18              <item>operator</item><tag>out='operator';
19          </tag></one-of>
20
21          <item repeat="0-1">please</item>
22      </item>
23  </rule>
24  </grammar>
```

In the case of this exemplary grammar, the following unique semantic interpretations would be extracted: out='balance'; out='mainmenu'; out='help'; and out='operator'. The spoken text for each option would be: account, main menu, help, and operator. The text is not used for exploration, but is used for the human readable flow chart.

Exploration engine 100 is further configured so that once the possible user inputs for a particular dialog state have been identified, each one (or some subset thereof) can be investigated. Although any particular method may be used for identifying the possible user inputs associated with a dialog state and preserving the ability to then investigate some or all of those dialog states, Applicants set forth an exemplary method (s) for doing so.

In that regard, exploration engine 100 may be configured to store each possible input (or some subset thereof) in a database. For example, possible responsive inputs to a particular dialog state may be saved in a "work queue." Thus, in various exemplary embodiments, exploration engine 230 comprises a work queue. The work queue may be a database configured to store paths that have been or remain to be searched and/or explored.

Figure 6:
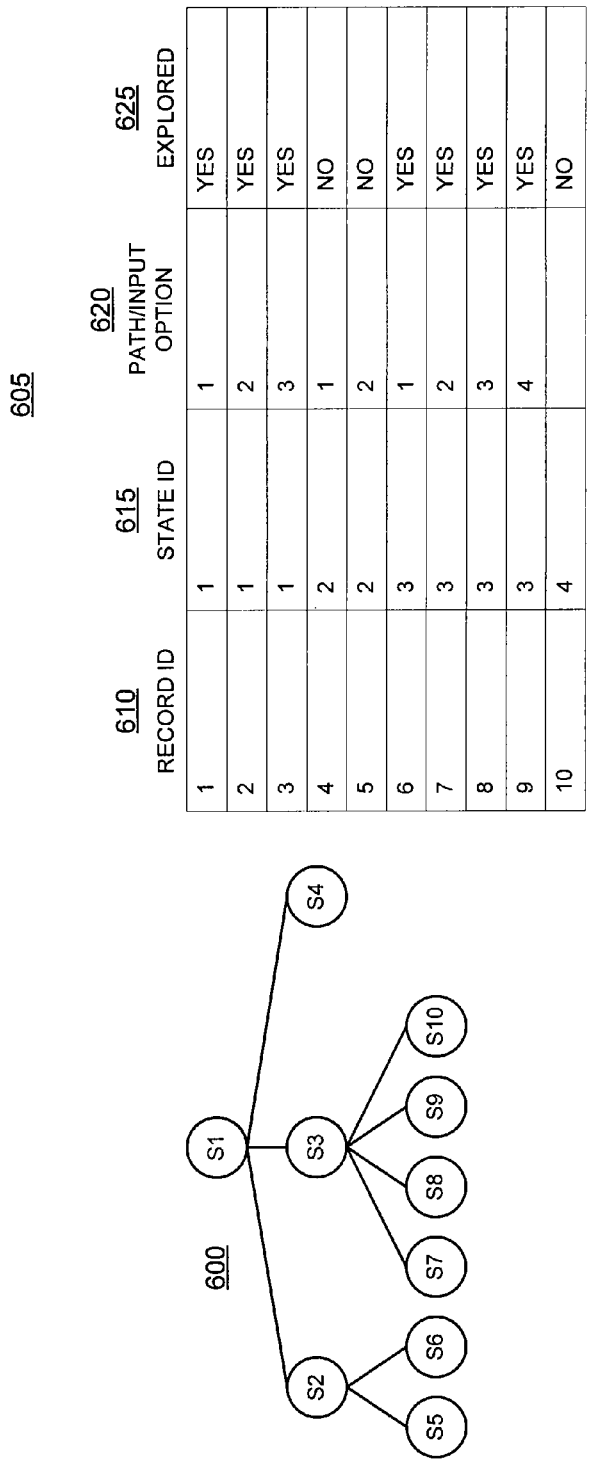
FIG. 6 illustrates an exemplary work queue in accordance with an exemplary embodiment of the present invention.

With reference now to FIG. 6, an exemplary work queue 605 is depicted in a spreadsheet like format, and with reference to a related exemplary state diagram 600. Each line/record of the spreadsheet 605 represents a possible responsive input for a particular dialog state. For example, each time the grammars at a particular dialog state 615 are analyzed, a record or records 610 in the work queue may be created with each record 610 representing one of the possible unique inputs 620 that may be received in that dialog state 615. As the exploration engine 230 traverses the voice application 255, moving from dialog state to dialog state, it will encounter new dialog states 615 with new possible user inputs 620. Work queue 605 may further include an indicator 625 that indicates whether, for each record 610, that particular option has been explored yet. Thus, the work queue is one exemplary way of keeping track of completed paths and paths not yet followed. In an exemplary embodiment, in addition to saving information identifying a path not taken, exploration engine 100 may also save the chain followed to get to the point where the path not taken begins. This additional information facilitates returning to the same state, in the same way, and choosing another path/input option to explore.

In accordance with an exemplary embodiment, the method may thus include the step of spawning a separate call process for each unique input identified from the grammars. After starting the new call, the steps followed to the current dialog state may be repeated and the discovery may continue using the new choice. It should be appreciated that the work queue may be any database or other program that facilitates identifying what inputs remain to be explored and how to get to that point so the path related to that input may be explored.

Exploration engine 100 may be configured to select one of the lines in the spreadsheet, mark that line as processed, and provide the responsive input associated with that line for that dialog state. Stated another way, exploration engine 100 may transmit one of the input options for a particular dialog state to a waiting web server 240. Upon receiving the responsive input, the voice application will proceed to another dialog state and the process will repeat itself in the next dialog state—often creating more lines in the spreadsheet for future investigation. This process may continue until the voice application reaches the natural "end of a call", until an error occurs that stops the process, or until the call flow reaches a dialog state that has already been encountered.

At this point, exploration engine 100 is configured to consult the work queue and start testing another path. Stated another way, exploration engine 100 is configured to look up another line in the spreadsheet that has not been processed, to start a new call, proceed to the dialog state associated with that line, mark that line as processed, and provide the responsive input associated with that line for that dialog state. This process may continue until all, or some subset, of the lines in the work queue have been processed.

As stated above, exploration engine 100 may be configured to investigate all of the possible inputs at a dialog state, or a subset thereof. In one exemplary embodiment, therefore, all the possible inputs at a dialog state are simply added to the work queue. This method may be appropriate where there is a relatively limited number of possible inputs and/or where it is desired that every possible path be explored (at least for that dialog state).

In other exemplary embodiments, only a subset of all the possible inputs are added to the work queue for future processing. Use of a subset may be desirable where the grammar allows a large set of unique values. For example, a grammar allowing a 10 digit phone number to be entered may have approximately 10 billion unique values.

Thus, in some exemplary embodiments, exploration engine 100 may be configured to explore a random selection of the possible inputs. For example, where 1000 different account codes are possible inputs at a particular dialog state, exploration engine 100 may be configured to randomly select 10 of the 1000 possible account codes as inputs that will be used at that dialog state in the call flow path determination. Thus, in this example, only the randomly chosen inputs will be added to the work queue for later processing. In this regard, exploration engine 100 may be configured to have rules or thresholds used to determine when it will begin to use a random sample of the possible inputs. These rules or thresholds may be modified by external inputs (for example, from Analyst 215 via client server 220. One exemplary rule, is to randomly select 5% of all possible account codes when a voice application requests the input of an account code.

In another exemplary embodiment, exploration engine 100 may be configured such that pre-selected responses may be provided to exploration engine 100 for use as specific inputs to be tried. For example, exploration engine 100 may be provided with 10 specific account holder names to be used among the nearly infinite options for account holder names that might be input. In this embodiment, the work queue would add the 10 paths to the queue for investigation. This methodology may also work well for account numbers where it is desirable to explore the voice application in connection with specific account types. Thus, exploration engine 100 may be configured to allow an analyst to input a limited set of training data to be used during the call flow discovery process.

In accordance with an exemplary embodiment of the present invention, and with reference again to FIG. 4, exploration engine 100 is also configured to create a unique identifier (ID) representing the current dialog state (Step 450). In various embodiments, the ID is based on the audio files and the grammars that are transmitted to exploration engine 230 and that pertain to the current dialog state (i.e., the dialog state relevant to the audio files and grammars). In other embodiments, the ID may be further based on the instructions provided in the document. For example, the ID may comprise a hash code. The hash code may be created, for example, based on the audio files and grammars related to the current dialog state being processed. In other embodiments, the ID is any unique identifier that will serve to distinguish one dialog state from another based on the content of the audio files, and grammars associated with that dialog state. Thus, exploration engine 100 is configured to create a unique ID for each dialog state such that no two dialog states having a difference in their related audio files and/or grammars would have an identical ID. The unique ID created in this manner is like a "fingerprint" associated with a particular dialog state. In this embodiment, the unique ID may be any code, symbol(s), and/or combination of numbers/letters that are based upon at least some of the available attributes of the dialog state.

In accordance with another exemplary embodiment of the present invention, exploration engine 100 is configured to recognize a unique identifier already associated with a particular dialog state. In this embodiment, the dialog state identifies itself with its own unique identifier. For example, a custom VXML property may be embedded in the document associated with that particular state. A custom VXML property has a name and a value. Thus, exploration engine 100 may be configured to look for a particular VXML property name, and use the value associated with that name as the unique ID for that dialog state. For example, the voice application may contain a VXML property named "ABC ID PROPERTY", and the application may contain a line setting ABC ID PROPERTY="Main Menu." This may be advantageous where a programmer wants to name some or all of the dialog states during development of the voice application.

In yet another embodiment, exploration engine 100 may first look for self-identifying information associated with a particular dialog state, and if none is provided, use the "fingerprinting" method of identifying that state. In this manner, a hybrid of automatically generated unique ID's and self generated unique ID's may be used to identify the discovered dialog states. Exploration engine 100 may further include logic to verify that no two ID's are alike and to automatically generate a unique ID for one of the dialog states if two ID's are alike. Thus, in general the unique ID may be any code, symbol(s), and/or combination of numbers/letters.

In accordance with an exemplary embodiment of the present invention, the identification process is weighted strongly by the active grammars for the current state. Nevertheless, because grammars may be reused in various dialog states, the states can be further disambiguated by the audio prompts played during the dialog states, by the instructions associated with the dialog states, or by other state attributes.

It may be expected that often no two dialog states will have exactly the same combination of prompts, instructions, and grammars. Therefore, under such circumstances calculating an ID based on such information is likely to create a unique ID for each dialog state. However, real world call flows have more complex situations that may be handled with additional enhancements to the procedure described above to better identify states and paths of the overall call flow.

In one exemplary embodiment, exploration engine 100 is configured to identify error processing loops. In a typical voice application, a "No Input" or "Failed Recognition" condition may result in an error message and a reprocessing of a dialog state. Even though the voice application call flow returns to the same state, exploration engine 100 may be configured to not stop the discovery just yet, but to retry the input a limited number of times. It may be that exploration engine 100 may discover that after some number of tries the call flow progresses to a different portion of the application (e.g., a transfer state, hang-up, or possibly a fallback dialog).

In another exemplary embodiment, exploration engine 100 is configured to identify "confirmation" and other processing loops. In many applications, there is a sequence of one or more inputs that are then presented back and the caller can confirm the input. If a negative response is returned, the user is usually allowed to reenter their input. Usually after a number of negative responses, the user may be routed to an alternate part of the application. Thus, in an exemplary embodiment, exploration engine 100 is configured to identify when a call has returned to a known state. If this state was reached by providing an input that was equivalent to a negative response for the current language (e.g. "no" for English), exploration engine 100 may be configured to reprocess the dialog state a limited number of times to determine if behavior changes. Furthermore, this method could be used in general for all identified call processing loops to insure behavior does not change when executed numerous times. Examples of this may include: use of the same input data, but different calls hear different audio clips; use of the same input data, but the call flow changes; and use of the same input data, but getting different application properties (e.g., properties, metadata). This approach would avoid language and cultural specific logic.

In yet another exemplary embodiment, exploration engine 100 is configured to identify reusable dialog states. In many applications, common inputs are shared by different parts of the call flow. For example, a birth date prompt may be used at several stages of information collection from the caller. From the Exploration Processes' perspective, the reusable dialog state will be "known" on the second experience. However, by including the dialog state that was used to reach the current state and the state reached after the input, the Exploration Process can determine that the dialog state is reused by multiple parts of the call flow.

The process of reusable dialog states can be extended to identifying collections of multiple dialog states. For example, the process of providing an address may consist of several dialog states that are used at different places in the call flow. Instead of stopping immediately when processing a known state, each call Exploration Process can go several dialog states further through the call flow to determine if there is a deviation in the call flow that would indicate that a collection of reusable dialog states is being experienced.

In another exemplary embodiment, it may be possible that two different states nonetheless are identical or nearly so such that a calculated ID is similar to the calculated ID for a truly distinct state. This might arise, for example, where two or more distinct dialog states each request the same information such as a birth date or social security number. In such a case, exploration engine 100 may see that the calculated IDs are similar. For example, both such dialog states may have one way in and one way out and may use the same audio and rules to request the information. Exploration engine 100 may, however, be configured to widen its search in such cases to determine if two similar dialog states are really the same dialog state or just similar dialog states. To do so, in one embodiment, exploration engine 100 is configured to include in its comparison (or ID calculation) further paths downstream to see where the two similar dialog states go next. The comparison could also depend on looking at a few steps prior to the current dialog state.

In accordance with yet further exemplary embodiments, exploration engine 100 is configured to save information it collects during the exploration/discovery process to a database (Step 450). The data base is referred to herein as a "call model" and is configured to store the results of the call flow detection performed by exploration engine 100. In one exemplary embodiment, exploration engine 100 is configured to save a record for each dialog state. The record may comprise the dialog state ID.

In accordance with an exemplary embodiment of the present invention, the "call model" may contain a collection of all unique dialog states identified by the exploration process. This includes: (1) the rules for identifying the dialog state (active grammars, audio clips, property settings or other aspects used to identify the state); and (2) a name for the state for display purposes. In an exemplary embodiment, exploration engine 100 is configured to allow the customer/user/analyst to change this name to facilitate more readable charts or graphical representations of the call flow. Saving the rules used to calculate the dialog state ID may be useful, for example, in case the rules change from time to time.

In accordance with an exemplary embodiment of the present invention, the "call model" may also contain some or all of the connecting routes between the discovered dialog states. This information may include information identifying the dialog state that led to a particular dialog state, and/or information identifying the dialog state that was reached from this particular dialog state. Moreover, if the transition from a first dialog state to a second dialog state occurs due to a valid input, the call model may also contain a textual representation of the input spoken to perform the navigation, and/or a semantic interpretation expression executed when navigating the path. On the other hand, if the transition from a first dialog state to a second dialog state occurs due to an invalid input, the call model may also contain a representation of the type of error (no input or failed recognition) and an attempt counter showing how many times the error was encountered before it stopped returning to the same state. Thus, the call model may comprise information regarding the relationship between the current dialog state and connected dialog states. For example, the record may include information about the connecting line or lines leading to that dialog state as well as what the input was that resulted in following that line. In one example, a record may include an ID number representing a particular dialog state and the number 2 or the speech recognized equivalent for "money market" representing a selected input option.

In accordance with an exemplary embodiment of the present invention, the "call model" may also contain a list of some or all of the issues experienced during the exploration process. Some of the issues that can be detected include: invalid or missing application documents (e.g., VXML, SALT, CCXML); invalid or missing grammar documents (e.g., SRGS); invalid or missing audio documents; missing resources; erroneous resources (e.g., syntax errors in grammars or VXML documents); application hang-ups or transfers that may be indications of an issue; issues that have been specifically identified by a user (e.g., the analyst may want to flag every situation that caused the audio, "error.wav" file to be played); input states that have a large number of valid responses, but have not been provided any training (e.g. account number prompt); situations where the application fails to respond within a specified time; and/or possible issues indicated if the application changes behavior between calls (e.g., with the same inputs a different output was received.) Exploration engine may be further configured to identify user defined error conditions, for example, where the user defines that the phrase "I'm sorry there are technical difficulties" indicates a fault. It will be appreciated that the ability to automatically investigate all or a large portion of the paths of a voice application makes it possible to identify/flag programming issues, hardware issues, application design issues, and aesthetic/functionality issues.

In accordance with an exemplary embodiment of the present invention, the "call model" may also contain a record of all calls made to explore the application. For example, saved data may include a list of all the prompts heard by the caller and all the input provided. This information about these calls can be used to allow the analyst to analyze the results of the call or see how errors occurred. These calls can also be rerun at a later date to find changes in an application (e.g. regression test, discussed herein).

In accordance with an exemplary embodiment of the present invention, the "call model" may also contain training data used at the time of the exploration. For example training data may be a list of account numbers, pins and other data provided by the analyst. Saving this data facilitates being able to know what data was used during an exploration that might have been run months ago.

Once the work queue has been completely processed, the call model comprises enough information to create a call flow that represents the voice application. As described herein, it should be apparent that it is possible to explore every possible call flow path in many voice applications. The ability to explore 100% of the call flow paths in even modest size voice applications has been previously unachievable and is a great advantage associated with the present invention. Even if less than 100% of the call flow paths are discovered, the present invention facilitates discovery of much more of the call flow than is possible using existing technology. Thus, the present invention may be useful in a great variety of voice applications. Some of these voice applications are described herein.

In the prior art, only 15-20% of the paths were every really tested in a voice application because the flow path was not entirely known and generating the test scripts was a manual process. A human would manually work through the voice application testing various portions of it. Thus, testing under the prior art is severely limited. In accordance with various embodiments of the present invention, all or at least greater than 80%, preferably greater than 90% of the call paths can be tested.

In one exemplary embodiment, exploration engine 100 may be further configured to draw a dialog state diagram based on the discovered call flow. For example, the dialog state diagram may be drawn based on the information stored in the call model. In this regard, exploration engine 100 may include functionality for preparing flow charts or other tools useful for understanding the discovered call flow. In other exemplary embodiments, third party software may be used for this purpose. For example, third party software is currently available from GraphViz, with a web address of http://www.graphviz.org/. Other providers that might be used include: JGraph Ltd., of Northhampton, England, http://www.igraph.com/; TomSawyer Software, of Oakland, Calif., http://www.tomsawyer.com/home/index.php; and the yFiles product by yworks GmbH, of Germany, http://www.yworks.com/en/products_yfiles_about.htm. Thus, in an exemplary embodiment, any third party provider of software may be used to display the discovered call flow in any suitable format.

In another exemplary embodiment, exploration engine 100 may be further configured to automatically generate a test script for a voice application. The exploration engine may be configured to automatically generate one or more test scripts based on the call flow discovered in accordance with the principles described herein. Thus, in an exemplary embodiment, not only is the generation of the test script performed automatically (without human intervention, or with minimal human intervention), but the generation of the call flow upon which it is based is performed automatically. In accordance with an exemplary embodiment of the present invention, the call flows are created in an automated manner and thus, the process of generating test scripts may be automated such that the entire process starting from detecting the call flow to generating the test scripts is performed automatically. Furthermore, the automatically generated test scripts may be run on an automated basis with the goals of: (a) seeing if a voice application design works, (b) determining if the voice application is running, (c) determining if every part of the voice application is working. In this regard, whether an application is running correctly may be determined by replaying calls made during the exploration process and verifying that the application behaves in the same manner (e.g., the same call flow is experienced, which includes the same audio files being played). The application may also be monitored to insure that it is still performing in a timely manner. This might be done by verifying that requests do not exceed an analyst specified threshold (e.g., that it does not take too long before a prompt is provided to the caller.)

In another exemplary embodiment, the exploration engine 140 may be further configured to discover things that are possible or likely problems with the voice application. Through the exploration process, the exploration engine 230 may identify collections of error as well as possible errors in order to alert the analyst 215 who may perform further analysis, repair errors, and/or contact the appropriate application developer. Specifically, the exploration engine 230 may detect hard errors. Hard errors result in a complete or partial malfunction of the application such that at least portions or unusable. Hard errors may result from application reference to malformed or missing VoiceXML documents, malformed or missing SRGS documents (Speech Recognition Grammar Specification), malformed audio files, no server response, and the like. In each case, hard errors may cause the application to terminate unexpectedly.

Possible errors are those where problems of unknown origin or cause possibly interfere with the execution of the voice application. Symptoms of such possible errors include, for example, missing audio files, hang-ups, call transfers, application behavior change between calls, slow response, and the like. These symptoms may or may not point to an application error, however, these symptoms often point to a issues that warrant further investigation. For example, voice applications often hang-up on callers when the application experiences a critical error. An analyst 215 may review a list of application hang-ups to determine if those application hang-ups were caused by an application problem.

In accordance with yet another embodiment of the present invention, exploration engine 100 is configured to be "trained." For example, analyst 215 may run the exploration and may note that a particular grammar has been flagged for the large number of responses. In that case, analyst 215 may train exploration engine 100 by providing it with test data (e.g., account numbers, pins, names, etc.) In another example, exploration engine 100 may flag an application "hang-up" or "transfer" that, upon analyst review, is a correct application behavior. Analyst 215 may "train" exploration engine 100 to thereafter suppress flagging that "hang-up" or "transfer" in future reports. In yet another example, exploration engine 100 may be trained to ignore specific behavior changes that are acceptable (e.g., different sound clips played at a bank balance playback). In an exemplary embodiment, this training comprises the input of data to exploration engine 100 by analyst 215, although any other method of adjusting the automated discovery process may be used. Thus, exploration engine 100 may be configured to be trained to adjust the manner in which it performs its automatic discovery of a call flow.

The exploration engine 230 may further enable analyst 215 to review other items of interest as well. Depending on the architecture of the voice application, it may be platform specific or otherwise not fully portable. In such cases, attempting to run the application on another platform may result in a partially or fully inoperable application. As such, an analyst may easily test the application on various platforms through the exploration engine 230. Further, the exploration engine 230 is able to detect user specified error conditions such as, for example, playing a specific audio clip, the specific transfer of calls, and/or reaching a specified dialog state.

In one embodiment, the exploration engine maintains records for all calls processed by the voice application. By providing a call review user interface, the analyst 215 may review calls by examining specific dialog states and ensuring that the input provided during the call matches the expected results (e.g., a matching account number to a played account balance).

In another exemplary embodiment, exploration engine 100 may be configured to see if a voice application has changed over time (regression testing), determine if the environment has changed, and determine whether dynamic data in an external repository has changed. In this embodiment, the voice application is analyzed a first time and the results are saved. Then the voice application is run at a second time a period of time later and the results of the second run are compared to the results of the first run (as the test is being run, or after the fact). If the results have changed despite using the same inputs, then the voice application may be non-deterministic, or someone may have changed the voice application since the first run. Thus, when a programmer intentionally changes one part of the voice application, running a regression test will allow the programmer to see if the voice application has only changed where a change was expected and desired, and verify that no undesired changes occurred elsewhere in the call flow.

It should be noted that the regression test may be executed directly via communication with web server 240. This exemplary embodiment could be executed by communications between exploration engine 230 and web server 240 not unlike communications already described herein. In another embodiment, the regression test may be executed by communication from exploration engine 230 through an analog phone line to IVR 235. The analog phone line may comprise, for example, E1, Integrated Services Digital Network ("ISDN"), VOIP, plain old telephone service ("POTS"), T1, or the like. Moreover, a translation device between exploration engine 230 and IVR 235 may be configured to translate the call control signals to facilitate this communication with the IVR. These communications may be digital, or analog (for example, POTS may use analog communications). In yet another exemplary embodiment, regression testing may be performed less directly. For example, exploration engine 230 may be configured to generate test scripts for existing call testing devices and these test scripts may then be run by an existing call testing device to perform the regression analysis.

In accordance with yet another exemplary embodiment, exploration engine 100 may be configured to perform improved load testing. Exploration engine 100 may be configured, for example, to present an analysis of which dialog states have the most connectivity (based on the discovered call flow). This may be useful in predicting where the greatest volume of voice application traffic will be congregated. Then targeted test scripts can be automatically generated to load test those dialog states and see if those states can handle the load. As with regression testing, load testing may occur directly between exploration engine 230 and web server 240, by way of analog communications and through IVR 235, and/or indirectly such as by generating test scripts that are run by a separate load testing device.

Load testing can identify application problems before placing it into production, thereby reducing the chances of costly failures. In one exemplary embodiment, exploration engine 230 may be configured to use the same calls captured in the regression test to generate a load against application 255. Data originating from web server 240 may include audio and text data that is converted into the expected time to play prompts. A call placing engine of exploration engine 230 may be configured to place and process calls at the same, or a similar, rate as an average caller. This can also provide a timing factor that can be adjusted to indicate a percentage of callers providing answers prior to output playback.

In accordance with yet another exemplary embodiment, exploration engine 230 may load test application 255 through IVR tests. Testing application 255 in this manner further tests the web server 240, the environment supporting the application, and data sources used by the application. With the information collected by the exploration process, there are at least two manners by which to test the application 255 and the telephony environment. First, the results of the exploration process enable the creation of a set of call scripts that may be executed by IVR 235. These scripts contain the caller input, and depending on the call-processing device, constraints relating to the application 255 response. Constraints may include, for example, maximum amount of silence after providing input, maximum amount of audio played to test the system, and entire audio portions of audio that can be matched against audio received by the call processing device.

A second way to test the application 255 and telephony environment is through direct call control. Rather than generating call scripts, exploration engine 230 may establish a direct interface with IVR 235 and directly drive calls. This may enable an unlimited number of call types to be processed including the processing of calls made during the exploration process. During the processing of a call, IVR 235 software applies the constraint tests, such as those listed above.

In accordance with yet another exemplary embodiment, exploration engine 100 may be configured to identify to an analyst what caused a voice application to stop running unexpectedly. For example, while running the voice application, exploration engine 100 may save all the information sent and received between exploration engine 230 and web server 240. This information can then be played back to see what caused the voice application to stop running unexpectedly. For example, an analyst may be able to step through the call flow if the analyst sees something odd, or if the voice application crashes. Exploration engine 100 may be configured to flag to the analyst all the points where the caller was transferred or hung up on so the user can see if those are legitimate places for that activity to happen.

In accordance with yet another exemplary embodiment, exploration engine 100 may be configured to provide an improved softphone. A soft phone is a tool used by developers to test the voice applications that are being created, modified, or just tested for other reasons. However, traditional softphones work through an IVR to test a voice application. In this exemplary embodiment, the new soft phone is configured to communicate directly with web server 240. In one embodiment, the new soft phone (which may be part of exploration engine 100) is configured to record the steps in the call flow, save a book mark at the command of the analyst 215, and then quickly repeat those steps bringing analyst 215 to back to the bookmarked spot in a rapid manner. Existing soft phones are less facilitating because they do not know when it's safe to say the audio input, or they would additionally need to hard code pauses. Thus, existing soft phones are also significantly slower.

Exploration engine 100, in another exemplary embodiment, is configured to take a developer quickly to a dialog state that is requested. Because the call flow paths have already been discovered, exploration engine 100 can quickly pick any route it wants to use to take the developer/analyst to that point in the call flow. This saves the developer a lot of time and they can focus on what they wanted to test.

Another improvement is that prior art soft phones went through the IVR 235 to run/test the voice application. For example, prior art soft phones involved terminals that would connect using VOIP protocol to the IVR and run through the IVR 235 to test the voice application. Although the present invention could run through the IVR 235, in many voice application testing environments, this is not desirable, and the present invention soft phone can be configured to communicate directly with the web server.

In accordance with yet another exemplary embodiment, exploration engine 100 is configured to facilitate providing consulting analysis functions. For example, exploration engine 100 may be configured to quickly determine if the menu is too complicated. In one example, exploration engine may identify a menu as too complicated because a caller has to go through 10 or more questions to get to a desired point in the call flow. In another example, the menu may be identified as too complicated because it is too wide with too many input options in one menu.

In further exemplary embodiments, exploration engine 100 may also be configured to quickly determine how difficult it is to get to help if error conditions arise. For example, exploration engine 100 may be configured to determine if an operator is reachable from any point in the call flow. Exploration engine 100 may also identify tasks that allow too many retries and recommend fewer retries. Exploration engine 100 may be configured to verify that user input is spoken back to the caller (variability in playback for difference choices, though call goes to the same dialog state). If not, exploration engine 100 may suggest that the application be modified to provide feedback to the caller. Exploration engine 100 may further be configured to flag long introductions and/or prompts that are too long.

In accordance with another aspect of the present invention, systems, methods and devices are configured to improve analysis of a voice application as it is actually used by real callers. Thus, in accordance with an exemplary embodiment of the present invention, a call statistics capture device 237 may be connected in between IVR 235 and web server 240. Call statistics capture device 237 may be configured to pass through communications back and forth between IVR 235 and web server 240. In addition, call statistics capture device 237 may be configured to insert and remove information, or modify information in the communications in a way that is useful in analyzing the performance of the voice application.

For example, call statistics capture device 237 may be configured to monitor and inject additional logic into the document as it is passed from the IVR to the application server and retrieve the results when the application posts the response back to the IVR. The type of logic injected into the document may be dependent on the nature of the desired information.

In another example, call statistics capture device 237 may be configured to initialize one or more variables and settings in a document or assign them particular values. Similarly, call statistics capture device 237 may be configured to read/extract those values at another point in the process. Thus, call statistics capture device 237 may be any device or combination of devices configured to intercept/monitor communications between IVR 235 and web server 240 and to modify those communications in a way that is useful in analyzing the performance of the voice application.

Figure 7:
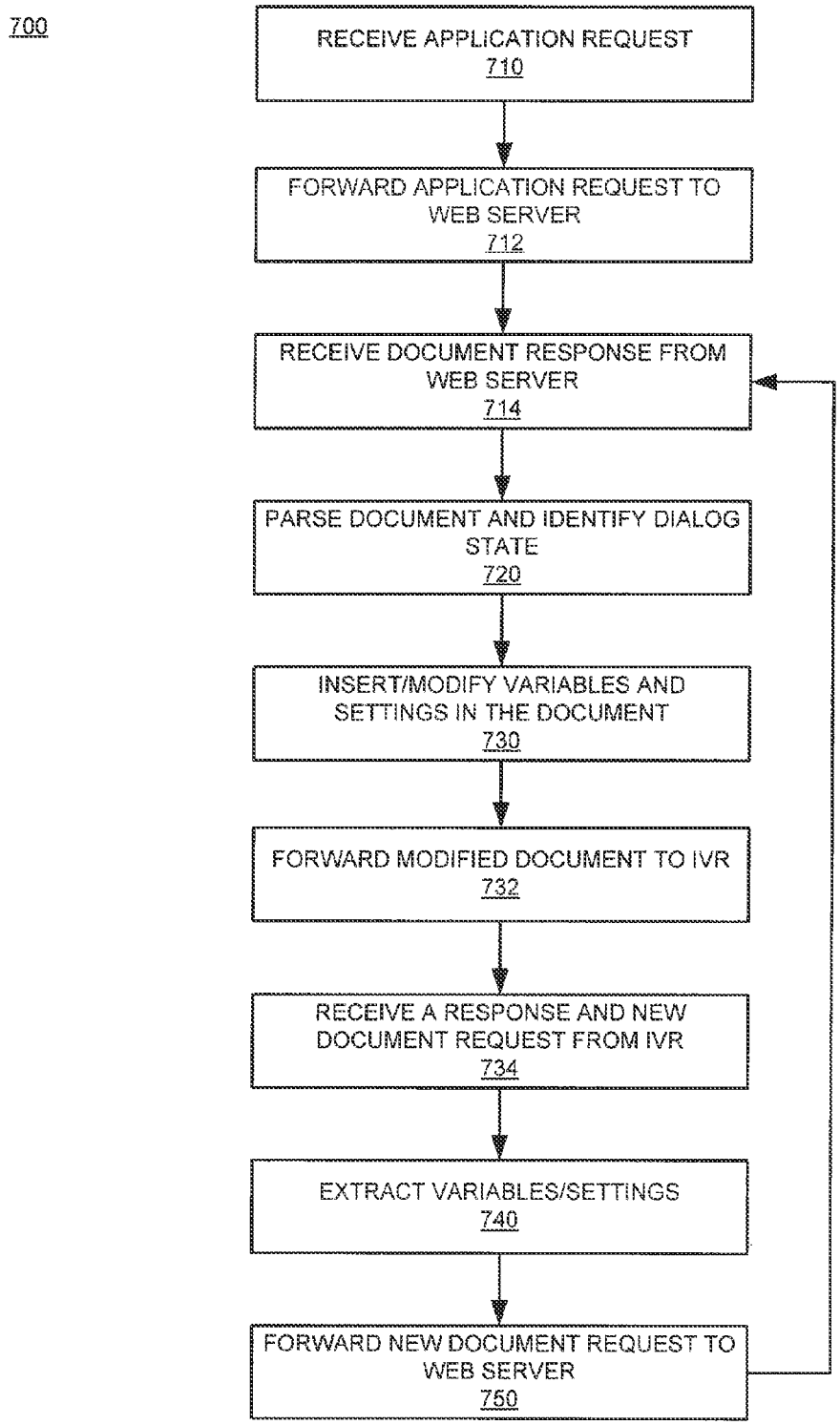
FIG. 7 illustrates an exemplary state identification process within an exemplary call flow detection process.

With reference now to FIG. 7, an exemplary method 700, for facilitating analysis of communications between IVR 235 and web server 240, is described. In accordance with various exemplary embodiments, this method may further take advantage of the state identification discovered by exploration engine 230. The method may be used to determine which dialog states caller 205 experiences and/or to determine how many errors caller 205 experiences for each dialog state.

In accordance with an exemplary embodiment, method 700 may comprise the steps of: receiving a document from a web server 240 (Step 714), parsing the document and/or identifying the current dialog state (Step 720), inserting/modifying variables and/or settings within that document (Step 730), forwarding the modified document to IVR 235 (Step 740), receiving a response and new document request from IVR 235 (Step 750), extracting variables and/or settings from the response/new document request (Step 760), and forwarding the new document request to the web server (Step 750). These and other steps are describe more fully below.

Initially, to start the call, IVR 235 may send a VXML application request (VXML will be used through out this example, although other applications may also be used). Thus, call statistics capture device 237 may receive from IVR 235 a VXML application request (Step 710). This application request may be any request configured to initiate a call with voice application 255. Call statistics capture device 237 may then forward the application request to the application server 240 (Step 712). Call statistics capture device 237 may next receive a VXML document response from application server 240 (Step 714). This document is similar to the documents discussed herein, comprising for example, tags, grammars, instructions, and/or the like.

In accordance with an exemplary embodiment, call statistics capture device 237 parses the received document. Call statistics capture device 237 may further identify the current dialog state (Step 720). This identification may occur, for example, by reference to the previously captured call flow data (obtained using the exploration process associated with exploration engine 230), or through use of identification techniques described herein. The identification of the current dialog state may be further disambiguated by using the expected location of the caller within the call flow. Thus, call statistics capture device 237 may be configured to communicate with discovered call flow model 120 or the like.

In accordance with further exemplary embodiments, call statistics capture device 237 is configured insert instructions and variables into the document received from application server 240 and to initialize those variables (Step 730). The information inserted and/or the modifications to the document are configured facilitate tracking the call flow when IVR 235 executes that document. In an exemplary embodiment, the inserted instructions and variables may be inserted where they will capture the most information. For example, caller input fields, audio output blocks, and any error processing tags (i.e., "noinput" and "nomatch" tags). The name lists in all submit tags may be modified to include all of the injected variables.

In an exemplary embodiment, call statistics capture device 237 forwards the modified document to IVR 235 (Step 732). IVR 235 may then execute that modified document and interact with caller 205. The variables that are selected may or may not be modified by the executing of the document by IVR 235. The variables may be modified to contain audio clips played, caller responses, behavioral actions such as error processing, and/or the like. Call statistics capture device 237 may then receive a new document request from IVR 235, which new document request may contain the response from the previous document execution (Step 734).

In an exemplary embodiment, call statistics capture device 237 extracts variables returned to call statistics capture device 237 with the new document request (Step 740). Some of these variables and/or settings may have been changed by the execution of the modified VXML document. Call statistics capture device 237 may be further configured to store such extracted information for additional analysis (step 750). For example, call statistics capture device 237 may update statistical call records with extracted data or data based on the extracted data. The statistical call records may be later used for further analysis or reporting. For example, the statistical call records may facilitate task success analysis (success rates), computing application usage statistics, caller tracking (experience tracking), and/or the like. Thus, call statistics capture device 237 may be configured to remove the previously injected (and possibly now modified) variable references and values from the new document request before forwarding the new document request to the web server 240 (Step 750). The process then repeats itself (returning to Step 714) until the call is terminated.

Thus, in addition to automated exploration and discovery of the call flow for a voice application, and in addition to automated testing of the voice application using test scripts, exemplary embodiments of the present invention may further facilitate automated statistical analysis of live calls with the analysis linked to specific dialog states. This may be used by an analyst to discover caller patterns, application success, and application issues to flag for further investigation.

As will be appreciated by one of ordinary skill in the art, the present invention may be embodied as a customization of an existing system, an add-on product, upgraded software, a stand alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, call flow data, dialog state data, carrier data; and/or like data useful in the operation of the present invention. As those skilled in the art will appreciate, client 220 computer may include an operating system (e.g., Windows NT, 95/98/2000, OS2, UNIX, Linux, Solaris, MVS, MacOS, etc.) as well as various conventional support software and drivers typically associated with computers. Client 220 computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (1002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference.

It is noted that the network may be implemented as other types of networks, such as an interactive television (ITV) network.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

According to one embodiment, client 220 related communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. In relation to interacting with application 255, the invention contemplates other types of markup language documents including, for example, VXML, CCXML, and SALT. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (1003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like.

Each analyst 215 (or equivalent) is equipped with a computing device in order to interact with the system and facilitate configuration and interaction with the exploration engine 230 and/or any other component disclosed herein. The analyst 215 has a computing unit in the form of a personal computer, although other types of computing units may be used including laptops, notebooks, hand held computers, set-top boxes, cellular telephones, touch-tone telephones and the like.

The invention is described herein with reference to screen shots, block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a device configured to implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

We claim:

1. A method for automatically detecting a call flow path of a voice application having a plurality of dialog states, said method comprising the steps of:
  identifying, in an automated manner, said plurality of dialog states of said voice application through execution of said voice application by:
    providing a signal to a web server running said voice application,
    wherein said signal initiates a call with said web server;
    receiving a first set of information from said web server;
    executing instructions in said first set of information and receiving a second set of information;
    creating a unique identifier (ID) for one of said plurality of dialog states, wherein said unique ID is based on said first and second sets of information;
    providing an input to said web server to cause said voice application to move to another dialog state; and
    storing said unique ID and other information associated with said dialog state; and
  identifying at least one relationship between said plurality of dialog states.

2. The method of claim 1, wherein said first and second sets of information comprise attributes associated with one of said plurality of dialog states; and further comprising the step of graphically illustrating a call flow path of said voice application based on the unique ID and other information stored in said database.

3. The method of claim 2, wherein said attributes comprise at least one of grammars, audio files, text, tags, and commands; and wherein said first set of information is in one of a VXML document, a CCXML document, and a SALT document.

4. The method of claim 1, further comprising the steps of:
  discovering possible inputs associated with one of said plurality of dialog states, wherein said possible inputs further include invalid inputs;
  storing said possible inputs in a work queue;
  sending a signal to said web server that mimics a response that said voice application expects for a first one of said possible inputs; and
  noting in a work queue that said first one of the possible inputs has been explored.

5. The method of claim 1, wherein said unique ID is a hash based on attributes associated with said first set of information.

6. The method of claim 1, further comprising the step of automatically identifying at least one of the following: states where there is no way to get operator assistance; menus that have more than a preset number of choices; tasks that allow more than a preset number of retries; tasks that involve too many inputs to complete; hang-ups; transfers; infinite call loops; application behavior change; and prompts that are longer than a preset length of time.

7. The method of claim 1, wherein said unique ID is a hash based on attributes associated with said first set of information.

8. The method of claim 1, wherein identifying said plurality of dialog states further comprises the steps of:
  initiating a simulated phone call with said voice application by reading a designated static page;
  receiving a first set of information from said designated static page;
  executing instructions in said first set of information and receiving a second set of information;
  providing an input to said voice application to cause said voice application to move to another dialog state; and
  storing said unique ID and other information associated with said dialog state; and
  wherein creating a unique identifier (ID) for at least one of said plurality of dialog states further comprises creating the unique ID based on said first and second sets of information.

9. The method of claim 1, further comprising the step of automatically identifying states that may have faults.

10. The method of claim 9, wherein said faults comprise at least one of the following: invalid or missing application documents, invalid or missing grammar documents, invalid or missing audio documents, user defined error conditions, and situations where the voice application fails to respond within a specified time.

11. A method for detecting, in an automated manner, a call flow path of a voice application having a plurality of dialog states, the method comprising the steps of:
sending a signal to a web server running said voice application, wherein said voice application is one of: a VXML application, a CCXML application, and a SALT application;
receiving, for each of said plurality of dialog states in said voice application, a document from said web server, said document comprising attributes, and said attributes comprising at least one of: grammars, sound clips, text, and tags;
creating a unique identifier (ID) for each of said plurality of dialog states based on said attributes;
identifying for a particular dialog state of said plurality of dialog states, and based on at least one grammar in said document, a set of possible inputs expected by said particular dialog state;
sending one of said set of possible inputs to said web server and queuing remaining said set of possible inputs for later exploration; and
storing information related to each encountered dialog state of said plurality of dialog states, wherein said information comprises said unique ID and transition information indicating, for each individual dialog state, how said each individual dialog state is connected to other dialog states.

12. The method of claim 11, wherein transition information comprises one of said set of possible inputs and an error condition, and wherein said error condition comprises one of a non-response and an invalid response.

13. The method of claim 11, further comprising the steps of:
identifying for each dialog state, those dialog states that input to that dialog state and those dialog states that are output from that dialog state; and
creating an output representative of the call flow of said voice application.

14. The method of claim 11, further comprising the steps of: graphically illustrating the call flow path of the voice application based on said unique ID and other information stored in said database.

15. The method of claim 11, further comprising the step of automatically identifying at least one of the following: states where there is no way to get operator assistance; menus that have more than a preset number of choices; tasks that allow more than a preset number of retries; tasks that involve too many inputs to complete; hang-ups; transfers; infinite call loops; application behavior change; and prompts that are longer than a preset length of time.

16. A method for dynamically detecting a call flow path for a voice application, the method comprising the steps of:
using an application to access the voice application and to work through each dialog state in the voice application, wherein working through each dialog state is accomplished by:
identifying a current dialog state with a unique identifier (ID);
identifying for said current dialog state, based on grammars associated with said current dialog state, all possible inputs that will cause a transition from said current dialog state; wherein said all possible inputs includes any input error conditions that will cause a transition from said current dialog state;
sending a signal representative of one of said all possible inputs and causing a transition from said current dialog state, wherein other non-sent possible inputs are saved for future exploration; and
repeating said identifying and sending steps for successive dialog states until one of the following two situations occur: call termination, and call flow returns to a state that has already been visited; and
upon occurrence of one of those two situations, stopping that exploration and pursuing another exploration based on a different one of said all possible inputs not yet investigated;
recording information relative to states visited and transitions from one state to another; and
determining a complete call flow path based on the connection of each dialog state to other dialog states in said voice application.

17. The method of claim 16, wherein said unique ID is formed by forming, for said each dialog state, a fingerprint based on attributes associated with that dialog state, wherein said attributes comprise at least one of: grammars, audio files, text, tags, and commands.

18. The method of claim 16, wherein said unique ID is based on a self identifying attribute comprising an application property set equal to a name for that state.

19. The method of claim 16, wherein said voice application is in one of a VXML document, a CCXML document, and a SALT document.

20. The method of claim 16, further comprising the step of automatically identifying at least one of the following: states where there is no way to get operator assistance; menus that have more than a preset number of choices; tasks that allow more than a preset number of retries; tasks that involve too many inputs to complete; hang-ups; transfers; infinite call loops; application behavior change; and prompts that are longer than a preset length of time.

21. A system for analyzing a voice application, the system comprising:
a voice application and a first web server configured to run said voice application;
an IVR in communication with said first web server;
an exploration engine, wherein said exploration engine comprises an exploration server running a program configured to communicate with said first web server by sending and receiving information to and from said first web server as if said exploration engine were said IVR;
wherein said exploration engine is further configured to automatically detect a call flow of said voice application running on said first web server; and
wherein said exploration engine is further configured to:
identify for a current dialog state, based on grammars associated with said current dialog state, all possible inputs that will cause a transition from said current dialog state;
wherein said all possible inputs includes any input error conditions that will cause a transition from said current dialog state;
send a signal representative of one of said all possible inputs and cause a transition from said current dialog state, wherein other non-sent possible inputs are saved for future exploration;
repeat said identifying and sending for successive dialog states until one of the following two situations occur: call termination and call flow returns to a state that has already been visited; and upon occurrence of one of those two situations, stop that exploration and pursue another exploration based on a different one of said all possible inputs not yet investigated.

22. The system of claim 21, wherein said voice application is one of a VXML application, a CCXML application, or a SALT application.

23. The system of claim 21, wherein said exploration engine is configured to create unique identifiers (IDs) for each dialog state in said voice application based on at least one of: attributes associated with a dialog state, and one of self identifying VXML, CCXML, and SALT properties.

24. The system of claim 21, wherein said exploration engine is configured to provide output that facilitates creating a graphical illustration of said call flow of said voice application.

\* \* \* \* \*